Patented Jan. 22, 1952

2,583,370

UNITED STATES PATENT OFFICE 2,583,370

METHOD OF STABILIZING DIOLEFINE POLYMER-SULFUR DIOXIDE REACTION PRODUCTS

Johan Michael Goppel and Gottfried Ernst Rumscheidt, Amsterdam, Netherlands, assignors to Shell Development Company, San Francisco, Calif., a corporation of Delaware No Drawing. Application July 3, 1948, Serial No. 37,056. In the Netherlands July 15, 1947

14 Claims. (Cl. 260—769)

This invention is directed to a process for the stabilization of products formed on reacting high molecular weight, polyunsaturated compounds with sulfur dioxide. The invention also relates to the resulting stabilized reaction products.

The term "high molecular weight, polyunsaturated compound," as employed herein, embraces those compounds having a molecular weight of at least 5,000 and which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Other high molecular weight polymers are those formed from acetylene hydrocarbons and their derivatives, as monovinyl acetylene polymer and divinyl acetylene polymer. Representative copolymers of high molecular weight which come within the term are those formed from butadiene, its homologues and derivatives, and from acetylene hydrocarbons and their derivatives, either in admixture (as the synthetic rubber Buna N, a copolymer of butadiene and acrylonitrile) or with other unsaturated organic compounds. Among the latter are the olefins, as isobutylene which copolymerizes with butadiene to form butyl synthetic rubber; the vinyls, as vinyl chloride, acrylic acid, methacrylic acid, and styrene, the latter compound copolymerizing with butadiene to form the synthetic rubber Buna S; as well as the vinyl esters and various unsaturated aldehydes, ketones and ethers, e. g., acrolein, methyl isopropenyl ketone, and vinyl ethyl ether. The above-defined, polyunsaturated, high molecular weight compounds may also properly be termed "high molecular weight polymers of diene-hydrocarbons." Alternatively, these high molecular weight, polyunsaturated materials, including both natural and synthetic rubbers, may be defined as rubbery polymers of at least one conjugated diolefin compound.

It is known that the high molecular weight polyunsaturated compounds lend themselves well to the production of various shapes, including those of a continuous, non-supported nature, as filaments, rods, strips, sheets, and the like. Furthermore, it is known that the properties of such shapes may be improved by reacting the unsaturated, high molecular weight compound with sulfur dioxide. The exact nature of this reaction is not clearly understood, though it is evident that a quantity of the sulfur dioxide is taken up in one form or another by the high molecular weight reactant. The extent of this reaction is normally measured by, and expressed in terms of, the amount of sulfur present in the resulting reaction product.

It has also been possible to improve the nature of the foregoing reaction products by incorporating therein, normally prior to the reaction with sulfur dioxide, a quantity of a low molecular weight, unsaturated compound. The resulting reaction product has a number of advantages, chief among which is a greatly improved acceptance for all the commonly employed dyestuffs. Representative unsaturated compounds which may be employed in this manner, all of which have a molecular weight of below 5,000, are alkadienes such as butadiene and 1,5-hexadiene, and alkenyl compounds such as allyl alcohol, allyl chloride, allyl acetate, allyl capronate, allyl isothiocyanate, allyl oleate, and more especially, diallyl compounds such as diallyl phthalate and diallyl adipate. The method by which unsaturated reactants of both high and low molecular weight are utilized in forming reaction products with acidifying compounds forms the subject of co-pending application, Serial No. 15,048, filed March 15, 1948, and reference is hereby made to said application for a more complete description of the invention there disclosed.

It should be noted that while the high molecular weight, polyunsaturated compounds, or mixtures of both high as well as low molecular weight unsaturated compounds, may be reacted with sulfur dioxide without prior modification of either reactant, improved results are obtained when the unsaturated compounds are first activated by treatment with an oxygen-yielding substance, preferably a peroxide such as decalin hydroperoxide, or tetralin hydroperoxide. Activation methods of this nature are disclosed in co-pending applications, Serial Nos. 760,924, filed July 14, 1947, now Patent No. 2,469,847, and 788,312, filed November 26, 1947, now Patent No. 2,558,498, to which applications reference is here made. The peroxide treatment is also disclosed in co-pending application Serial No. 15,048, referred to above, as said activation treatment relates to mixtures of high and low molecular weight unsaturated reactants.

While the reaction products discussed above have proven well adapted for many uses, they have proven particularly useful when formed into filaments of the type which can be woven into textiles, either alone or in conjunction with fibers of other materials. Thus, filaments produced by spinning a peroxide-activated rubber solution into a sulfur dioxide-containing coagulating bath have a high elementary denier, with good tensile strength, a relatively high degree of elongation prior to rupture, and good flexibility and other characteristics making for ease of working and handling. In view of these many favorable qualities, it has been highly disappointing to realize that even in the case of the best reaction products hitherto obtainable, deterioration of the filament or other shape with age is unduly rapid. This deterioration is manifested in a variety of ways, but chiefly in a sharp falling off in tensile strength and in the degree of permissible stretch prior to rupture. In many instances undesirable color changes also ensue. These various changes are greatly speeded up as the objects under consideration are heated, particularly above 100° C., or are exposed to ultra-violet light. It has been observed that the deterioration in physical properties is attended by a loss of sulfur dioxide from the reaction product, a loss which is generally proportional to the aforementioned deterioration. Accordingly, the rapidity with which a given product loses its sulfur dioxide constituent may also be taken as a measure of its stability, i. e., its resistance to deterioration with age, heating, and/or exposure to ultra-violet light.

It is an object of the present invention to provide a method for obtaining stable products of the type formed on the reaction of high molecular weight, polyunsaturated compounds with sulfur dioxide, or of both such compounds with low molecular weight, unsaturated compounds.

A more particular object is to provide filaments and like continuous, non-supported shapes composed of the reaction products discussed above, yet which are highly stable and are characterized by a continued high tensile strength and degree of stretch prior to rupture, as well as by a relatively small loss of sulfur dioxide, when said filaments or shapes are aged, heated and/or exposed to ultra-violet light.

The nature of still other objects will become apparent from the following description of the invention.

It has been discovered that excellent resistance to deterioration with age, heat and/or exposure to ultra-violet light may be imparted to objects composed of the product formed on reacting high molecular weight, polyunsaturated compounds with sulfur dioxide and either with or without a low molecular weight unsaturated compound, by causing said objects to be impregnated with a compound of the general formula:

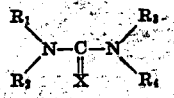

wherein X is oxygen, sulfur or the imino (NH) group and $R_1$, $R_2$, $R_3$ and $R_4$, which may be the same or different, represent hydrogen atoms, hydrocarbon radicals, or polar-substituted hydrocarbon radicals.

When $R_1$, $R_2$, $R_3$ and $R_4$ are hydrogen, the compound is urea, thiourea or guanidine, as the case may be. Suitable radicals which $R_1$, $R_2$, $R_3$ and $R_4$ may represent are alkyl, aryl, alkenyl, alkaryl, aralkyl, aralkenyl, alicyclic, and the like. Representative compounds which are useful in the execution of the present invention are urea; thiourea; guanidine; ethyl urea; ethyl thiourea; ethyl guanidine; amyl urea; amyl thiourea; amyl guanidine; N,N-dimethyl urea; N,N-dipropyl thiourea; N,N-diethyl guanidine; N,N'-diethyl urea; N,N'-diamyl thiourea; N,N'-dipropyl guanidine; N-methyl-N'-propyl thiourea; benzyl urea; phenyl urea; xylyl urea; benzyl thiourea; phenyl thiourea; xylyl thiourea; benzyl guanidine; phenyl guanidine; xylyl guanidine; m-tolyl thiourea; N,N-dibenzyl urea; N,N-dibenzyl thiourea; N,N-dibenzyl guanidine; N,N-diphenyl urea; N,N-diphenyl thiourea; N,N-diphenyl guanidine; N,N'-diphenyl urea; N,N'-diphenyl thiourea; N,N'-diphenyl guanidine; N-methyl-N'-phenyl thiourea; 1-naphthyl urea; N,N'-di(1-naphthyl)-thiourea; N,N-di(2-naphthyl)-guanidine; vinyl urea; vinyl thiourea; vinyl guanidine; allyl urea; allyl thiourea; allyl guanidine; N,N-divinyl urea; N,N-diallyl thiourea; N,N-dibutenyl guanidine; N-vinyl-N'-phenyl urea; N-allyl-N'-phenyl thiourea; N-allyl-N'-phenyl guanidine; N,N'-diethyl-N,N'-diphenyl thiourea; tetraphenyl thiourea; N,N-divinyl-N-N'-diphenyl thiourea; and the like and their homologues; as well as such polar substituted compounds as N-phenyl-N'-acetyl thiourea; N,N'-bis(4-chlorophenyl)-thiourea and N-phenyl-N'-(4-chlorophenyl)-thiourea. Other suitable compounds of the general type indicated above are those substituted by such polar groups as OH, NH, $NH_2$, COOH, $SO_3H$, SO, $SO_2$, and $NO_2$, always provided the polar-substitution does not interfere with the desired stabilizing action.

Still other compounds which have been found useful in stabilizing the reaction products here under consideration are those obtained on reacting the above-mentioned compounds, as urea, thiourea, guanidine, or the like, with aldehydes, carboxylic acids, or isocyanates. In this respect particularly good results have been obtained with the compound formed on reacting thiourea with either formaldehyde or an isocyanate, as ethyl or allyl isocyanate.

A preferred class of compounds for use in the present invention is that comprising urea, thiourea and guanidine, as well as the aryl-substituted ureas, thioureas and guanidines, by which term is meant those compounds wherein at least one of the members represented by $R_1$, $R_2$, $R_3$ and $R_4$ in the general formula above is a phenyl, or a condensed phenyl, nucleus which may itself be substituted by another hydrocarbon or by a polar grouping. Thus, representative aryl-substituted thioureas are N-methyl-N'-phenyl thiourea; N,N'-diphenyl thiourea; N,N-diphenyl thiourea; o-tolyl thiourea; N-(2-carboxyphenyl), N'-ethyl thiourea; naphthyl thiourea; and the like. Similar aryl-substituted ureas and guanidines could also be mentioned as examples of this preferred grouping. Also included in this preferred class are the reaction products of aryl-substituted ureas, thioureas and guanidines with aldehydes or isocyanates, as the products obtained on reacting phenyl thiourea with formaldehyde or ethyl isocyanate. A still more preferred group of stabilizers is that consisting of thiourea and the phenyl-substituted thioureas, particularly N,N- and N,N'-diphenyl thiourea, the compounds in this more limited group having the best stabilizing action with the widest variety of materials.

The stabilizer chosen, which may be a mixture of several compounds, can be introduced into the reaction product in one or more of a number of different ways. Thus, for example, the stabilizer may be added to the solution of rubber or other polyunsaturated high molecular weight reactant before the same is brought into reactive engagement with the sulfur dioxide or other acidifying compound employed; alternatively, it may be added to the medium containing the sulfur dioxide. The practice of either of the foregoing methods requires that the stabilizer be soluble or at least dispersible in the liquid medium present, and preferably it should in no way interfere with the desired reaction between the respective unsaturated and sulfur dioxide compounds. Since some such interference may occur, particularly as the concentration of stabilizer is increased or the more alkaline stabilizers are employed, the preferred manner of adding the stabilizer is to bring a solution thereof into contact with the already formed reaction product. Thus, filaments produced by spinning a solution of peroxide-activated rubber into an ethanol-water-sulfur dioxide coagulating bath may thereafter be immersed in a solution of a stabilizer, as thiourea or diphenyl thiourea in ethanol, for example, and left therein for any desired period of time. On being withdrawn from the stabilizer solution, the filaments may then be washed in the conventional manner, as with alcohol, water, dilute caustic or other liquid, following which they may be dried and used. Another method by which the reaction products here under consideration may be stabilized is to bring said products into contact with an atmosphere containing the stabilizer in the vaporous or atomized state, the stabilizer then being precipitated on the object. Again, a reaction product treated at one stage or another with a stabilizer by any of the methods indicated above may thereafter be treated with an aldehyde, isocyanate or like compound capable of reacting with the stabilizing compound already present, the resulting product having the advantage that the stabilizer is somewhat more firmly bound within the reaction product, and thereby more resistant to being removed by subsequent washing operations, than would otherwise be the case, all at no reduction in the stabilizing action.

The concentration of stabilizer to employ, whether the same be added to the unreacted materials, or is applied as a solution to the already formed reaction product, is not critical. Thus, good results are obtained with solutions containing from about 0.25 to 20 per cent or more of a stabilizer, and some improvement can be effected even when using even smaller quantities than 0.25 per cent, these percentages being based on the over-all weight of the solution, whether the latter be a solution of unreacted rubber or sulfur dioxide, for example, or contain only the stabilizing compound. Preferably, the concentration of stabilizer should be at least 0.5 per cent, based on the entire weight of the solution, with concentrations of more than 10 per cent seldom being justified in terms of improved results.

The period during which any given reaction product should be left in a stabilizer solution will vary depending on a number of circumstances. Thus, in the case of filaments and other small shapes the soaking period may be somewhat shorter than with articles of greater cross section. Again, with more concentrated stabilizer solutions the soaking period may be somewhat shortened. Another factor is the ease with which the reaction product is able to take up the stabilizer solution; thus, freshly formed, undried products are considerably more receptive to the stabilizer solution than are objects which have already been dried and now must take up fresh quantities of solvent along with the dissolved stabilizer. In general, immersion periods of from ½ to several hours are preferred, for although much shorter periods than this can often be used quite successfully, extension of the soaking time is in no way harmful and in many cases proves of considerable benefit. In those cases where the stabilizer is added to the unreacted solution of rubber or sulfur dioxide, for example, no modification need be made in the normal process by which said compounds are reacted.

Of more importance than the duration of the treatment with stabilizer solution is the temperature thereof. It forms a feature of the present invention that improved results are obtained by employing a heated stabilizer solution, by which term is meant a solution having a temperature of 75° C. or above, and preferably between 100 and 150° C. While use of such heated solutions does not necessarily shorten the time of treatment, it does serve to fix the stabilizer in the reaction product, thereby increasing its resistance to removal during subsequent washing and treating steps. This feature of the invention is particularly apparent in the case of thiourea, the phenyl substituted thioureas and the reaction products of thiourea with such compounds as formaldehyde or an isocyanate, and it is preferred that a heated stabilizer solution be used whenever these compounds are employed. While the preferred method of conducting this feature of the process is to immerse the formed reaction products to be treated, as filaments or the like, in a heated solution of stabilizer for the desired interval, somewhat equivalent results may be obtained by adding the stabilizer to the reaction product in any of the methods suggested above and thereafter heating the stabilizer-containing product in either a liquid or a gaseous environment. By whatever method the heating be carried on, heating periods as short as 10 minutes prove of measureable benefit, though periods of from ½ to 2 or more hours are preferred.

It has also been found that improved results as regards fixation of stabilizer may be obtained by utilizing compounds such as N-allyl-N'-phenyl thiourea, N-methallyl-N'-phenyl guanidine, N,N-diallyl-N',N'-diphenyl thiourea, and N-vinyl-N'-phenyl urea, or their various derivatives and homologues, all of which compounds contain one or more alkenyl or other unsaturated, aliphatic group. Such unsaturated stabilizing compounds as these are preferably introduced into a solution of rubber or other high molecular weight reactant prior to its reaction with the acidic compound if the full effect of the stabilization treatment is to be obtained, for it seems quite probable that under these circumstances the stabilizer enters into, and chemically forms a part of, the final reaction product.

As has been disclosed above, still a third way of improving the bond between the reaction product and the stabilizer is to treat the already stabilized product with an aldehyde or isocyanate, the stabilizer present in the product reacting with the aldehyde or isocyanate under these circumstances to form condensation or poly-addition compounds, either of which are of such a character as to resist being washed out of the product.

Where the formed reaction products are to be stabilized through treatment with a solution of a stabilizer compound, the latter may be dissolved in any appropriate solvent which has no appreciable solvent action on the reaction product itself. Thus, ethanol, acetone and mixtures thereof have been found to be particularly suitable as solvents for the various stabilizers suggested herein, though other liquids, particularly the lower aliphatic alcohols and ketones, as proponol, isobutanol and methyl ethyl ketone have also been used with success. With some of the more alkaline stabilizer compounds, as guanidine, for example, it is preferred that the solutions thereof be buffered or otherwise reduced to near-neutrality.

EXAMPLE I

Filaments were prepared by spinning a 6.5% solution of natural rubber in benzene (which solution also contained 15% tetralin hydroperoxide, based on the weight of rubber present) into a coagulating bath consisting of equi-molar proportions of acetone and sulfur dioxide, the bath being maintained at 15° C. Use of such a bath, it may be noted, is disclosed in copending application Serial No. 33,229, filed June 15, 1948, now Patent No. 2,578,063, to which reference is here made. These filaments, on being washed in alcohol and dried, were found to contain 22% by weight of sulfur.

The dried filaments were then divided into three lots. One lot was stabilized by being soaked for a period of four hours in a 2% by weight solution of urea in ethanol at a temperature between 20 and 25° C., after which the filaments were thoroughly washed with ethanol and dried in air. The second group of filaments was treated in this same manner except that thiourea was substituted for urea as the stabilizer. The third group of filaments, which constituted the control, was soaked in ethanol free of any solute.

The soaked and dried filaments from each of the three above groups were then given an accelerated aging test wherein the filaments were heated in air at 125° C. for an hour. At the end of this time, the sulfur content of the filaments was again measured and the sulfur loss expressed in terms of the decrease in percentage of sulfur dioxide, based on the weight of the entire sample. In the case of the unstabilized, control filaments, the sulfur dioxide loss was 1.7%, indicative of rapid aging. The urea-treated filaments lost but 0.6% sulfur dioxide and the thiourea treated filaments only 0.2%, thereby demonstrating the effectiveness of both urea and thiourea as stabilizers.

EXAMPLE II

The procedure outlined in Example I above is repeated except that in this case the freshly prepared undried filaments, instead of the dried filaments, were soaked in the ethanol-urea and ethanol-thiourea stabilizing solutions. In this case comparable results as regards stabilization are obtained utilizing soaking periods as short as ½ hour.

EXAMPLE III

Dried filaments were prepared in the same manner as described above in Example I, the first paragraph. Here again the filaments were divided into three groups. The first group was immersed for four hours in a 2% solution of thiourea in a solvent made up of equal parts of ethanol and acetone and maintained at approximately 20 to 25° C., following which the filaments were washed in ethanol and dried. The second group of filaments was treated in a similar manner but with N,N'-diphenylthiourea being substituted for thiourea. The third (control) group was soaked under the same conditions, but without any stabilizer being present.

The tensile strength of the three groups of dried filaments was then determined. Following this the filaments were heated in air at 125° C. for eight hours with their tensile strength being measured at 2-hour intervals during the heating period. The results as given in the Table I below demonstrate the remarkable stabilizing action exerted by thiourea, and to a but slightly lesser extent by N,N'-diphenylthiourea, as compared with the control group.

*Table I*

| Stabilizer | Heating time, in hours | | | | |
|---|---|---|---|---|---|
| | 0 | 2 | 4 | 6 | 8 |
| | Tensile strength as percentage of tensile strength prior to heating | | | | |
| None | 100 | 85 | 82 | 52 | 41 |
| Thiourea | 100 | 100 | 100 | 100 | 94 |
| N,N'-diphenyl thiourea | 100 | 98 | 98 | 90 | 80 |

EXAMPLE IV

In this operation rubber-sulfur dioxide filaments prepared as in Example I were subjected to accelerated aging under the influence of an 800 w. Hanau lamp, at a distance of 80 cm. Here again, one group of filaments served as a control. The second group was immersed for a period of four hours, at room temperature, in a 2% solution of thiourea in an ethanol-acetone solvent. The third group was similarly immersed in a 3% solution of N,N'-diphenyl thiourea and the fourth group in a 4% solution of N,N'-diphenyl guanidine. The results given in the Table II below illustrate the deterioration in tensile strength resulting after 17 and 34 hours exposure to the lamp.

*Table II*

| Stabilizer | Exposure to light, in hours | | |
|---|---|---|---|
| | 0 | 17 | 34 |
| | Tensile strength as percentage of tensile strength prior to exposure to light | | |
| None | 100 | 69 | 54 |
| Thiourea (2% sol.) | 100 | 99 | 81 |
| N,N'-diphenyl thiourea (3% sol.) | 100 | 84 | 76 |
| N,N'-diphenyl guanidine (4% sol.) | 100 | 95 | 87 |

EXAMPLE V

The operation here described illustrates the manner in which heating of the previous stabilized reaction product serves to fix the contained stabilizer, thereby in large part preventing its removal during subsequent washing steps. In this case the thread-shaped rubber-sulfur dioxide reaction products, produced as described in Example I, were divided into seven lots. Lot 1 was a control and was neither stabilized nor given any other treatment prior to being subjected to the stabilizing test involving heating in air at 125° C. for several hours. Lots 2, 3, 4, 6 and 7 were all given an initial impregnation test in a 2% solution of thiourea in ethanol at room temperature. Lot 2 was then tested by being heated at 125° C. in air without any further treatment. Lot 3, following thiourea impregnation, was washed for 48 hours with ethanol following which it was heated in air at 125° C. Lot 4 was treated as lot 3 except that prior to the step of washing for 48 hours with ethanol, different portions thereof were heated in air at 125° C. for periods of 10, 30, 60 and 120 minutes, respectively, this being the heating step whose effectiveness is to be demonstrated. Table III given below shows the value of the more extended of these intermediate heating treatments, with some improvement resulting even in the case of the shortest heating time.

Lot 5 was first washed for four hours in a 0.1 N in a solution of sodium hydroxide, then for 48 hours in water, and then for 24 hours in ethanol, all at room temperature, following which the washed filaments were tested by being heated in air at 125° C. to ascertain their sulfur dioxide loss. Lot 6 was treated in a manner identical with lot 5 except, as indicated in the above paragraph, it was first impregnated with thiourea solution prior to any washing steps. Lot 7 was treated in a manner similar to lot 6 except that here the thiourea treated filaments were heated in air at 125° C. for 120 minutes prior to the subsequent washing steps and the testing in hot air. Table III again clearly brings out the value of such a preliminary heating treatment in the case of lot 7 as compared with lots 5 and 6.

7. The method of claim 1 wherein the stabilizer is phenyl thiourea.

8. In a method for improving the resistance to deterioration with age of a product formed by reacting only sulfur dioxide with a rubbery polymer of at least one conjugated diolefin compound, the steps comprising immersing said product in a solution containing from 0.25 to 20% of a thiourea compound and thereafter drying the stabilizer-containing product.

9. The method of claim 8 wherein the solution of the thiourea compound is maintained at a temperature above 75° C. during at least a portion of the immersion step.

10. The method of claim 8 wherein there is employed the step of heating the product at a temperature above 100° C. after its immersion in the stabilizer solution.

11. The method of claim 8 wherein the stabilizer compound is thiourea and wherein there is employed the step of heating the product at a temperature above 100° C. after its immersion in the stabilizer solution.

12. The product produced by the method of claim 8.

13. The method of claim 8 wherein the product immersed in the stabilizer solution is one formed on the reaction of only a sulfur dioxide with a rubbery polymer of at least one conjugated di-

Table III

| Lot No. | Operations prior to stabilization test | Period of heating prior to stabilization test in minutes | SO₂ split off prior to stabilization test, in per cent by weight | SO₂ split off in stabilization test, in per cent by weight after— | | Rate of decomposition in stabilization test, per cent by weight of SO₂ per hour, after— |
|---|---|---|---|---|---|---|
| | | | | 2 hrs. | 3 hrs. | 3 hrs. |
| 1 | none | | | 1.6 | 2.4 | 0.8 |
| 2 | impregnation | | | 0.1 | 0.11 | 0.01 |
| 3 | impregnation and washing with alcohol. | | | 0.24 | 0.48 | 0.32 |
| 4 | impregnation, heating to fix stabilizer washing with alcohol. | 10 | 0.03 | 0.20 | 0.42 | 0.27 |
| | | 30 | 0.05 | 0.16 | 0.30 | 0.16 |
| | | 60 | 0.08 | 0.13 | 0.21 | 0.09 |
| | | 120 | 0.10 | 0.11 | 0.18 | 0.07 |
| 5 | washed with: a. NaOH b. water c. ethanol | | | 11.8 | 14.2 | 2.4 |
| 6 | impregnation washed with: a. NaOH b. water c. ethanol | | | 9.3 | 12.1 | 2.8 |
| 7 | impregnation heating to fix stabilizer washed with: a. NaOH b. water c. ethanol | 120 | 0.1 | 2.1 | 2.9 | 0.8 |

We claim as our invention:

1. The method of increasing the resistance to deterioration with age of a product formed on the reaction of only sulfur dioxide with a rubbery polymer of at least one conjugated diolefin compound, said method comprising immersing said product in a solution containing from 0.25 to 20% of a thiourea compound.

2. The method of claim 1 wherein the stabilizer-containing reaction product is impregnated with formaldehyde to fix the stabilizer compound in the reaction product.

3. The method of claim 1 wherein the stabilizer-containing reaction product is impregnated with ethyl isocyanate to fix the stabilizer compound in the reaction product.

4. The method of claim 1 wherein the stabilizer is thiourea.

5. The method of claim 1 wherein the stabilizer is N,N'-diphenyl thiourea.

6. The method of claim 1 wherein the stabilizer is N,N-diphenyl thiourea.

olefin compound and with an unsaturated compound of low molecular weight.

14. The product produced by the method of claim 13.

JOHAN MICHAEL GOPPEL.
GOTTFRIED ERNST RUMSCHEIDT.

REFERENCES CITED

The following references are of record in the file of this patent:

UNITED STATES PATENTS

| Number | Name | Date |
|---|---|---|
| 2,198,927 | Waterman et al. | Apr. 30, 1940 |
| 2,281,410 | Burke et al. | Apr. 28, 1942 |
| 2,373,049 | Pedersen | Apr. 3, 1945 |
| 2,379,354 | Hilton | June 26, 1945 |
| 2,416,061 | McAlevy et al. | Feb. 18, 1947 |

FOREIGN PATENTS

| Number | Country | Date |
|---|---|---|
| 593,036 | Great Britain | Oct. 7, 1947 |